(No Model.)

T. F. DEAN.
DEVICE FOR JOINTS IN COOKING UTENSILS.

No. 315,917.   Patented Apr. 14, 1885.

WITNESSES:
Fred Harris
Chas. S. Gooding.

INVENTOR:
Thomas F. Dean.
by Bowdoin S. Parker
his atty.

UNITED STATES PATENT OFFICE.

THOMAS F. DEAN, OF BOSTON, ASSIGNOR TO STILLMAN W. CHAMBERLIN, OF SOMERVILLE, MASSACHUSETTS.

DEVICE FOR JOINTS IN COOKING UTENSILS.

SPECIFICATION forming part of Letters Patent No. 315,917, dated April 14, 1885.

Application filed March 8, 1884. (No model.)

*To all whom it may concern:*

Be it known that I, THOMAS F. DEAN, of Boston, in the county of Suffolk and State of Massachusetts, a citizen of the United States, have invented a new and useful Improvement in Devices for Joints in Cooking Utensils, of which the following is a full, clear, and exact description, reference being had to the accompanying drawings, forming a part of this specification, and in which like letters of reference indicate corresponding parts.

My invention relates to a device for forming a tight joint in cooking utensils (the several parts of which are made removable from each other) by means of two peculiarly-formed continuous concentric metal rings or rims, combined, adapted, and applied as hereinafter described.

Figures 1, 2:
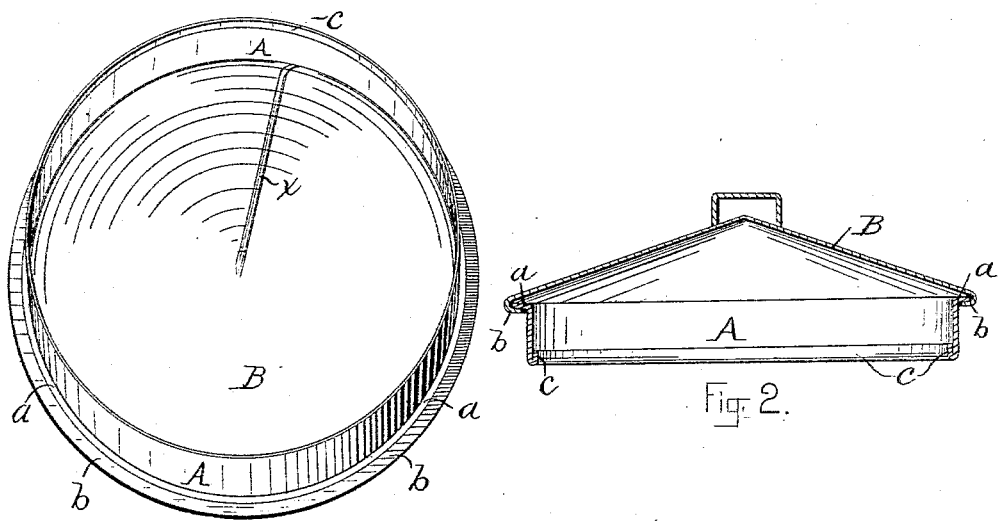
Figure 3:
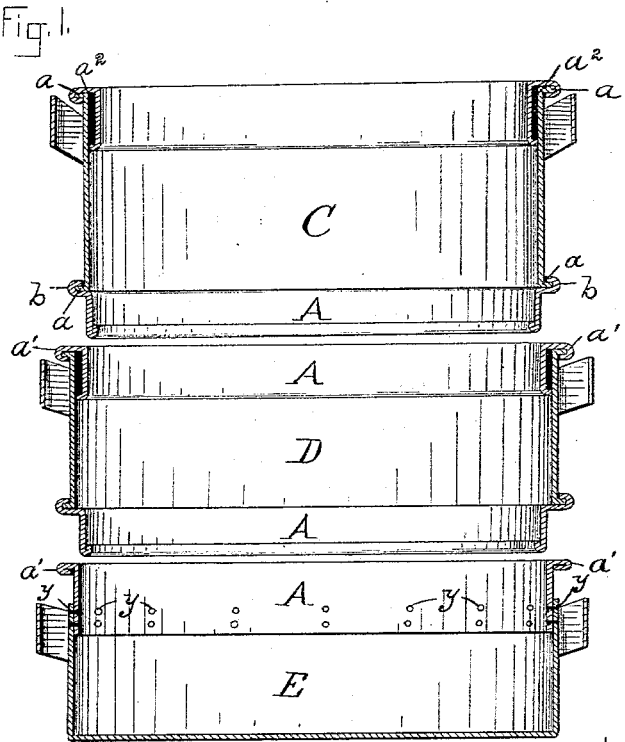

In the drawings, Figure 1 is a perspective view of one of my rings attached to a cover-top. Fig. 2 is a section illustrating how the ring may be united to a cover-top. Fig. 3 is a sectional elevation of a steam cooking utensil in which the manner of forming the joint by combining the contacting surfaces of the concentric rings in the union of the several sections or compartments of the steamer is shown.

A is a ring; $a$, a slight projection by which it is secured to the article, compartment, section, or cover. The mode of uniting is shown in Figs. 1 and 2.

B is a cover-top having the lap $b$, which lap folds over the projection $a$. The projection $c$ upon the opposite edge of the ring may be added, and can be folded down upon the inside to stiffen the ring if found desirable.

In Fig. 3 a steam-cooker is shown, C, D, and E being different compartments, between which the continuous concentric rings are placed. The rings may be secured to the parts of the cooker in any desired manner, the way shown in Figs. 1 and 2 being suitable.

The object and chief purpose of my present invention is to furnish a cheap, durable, and practically perfect device for a joint to be applied to cooking utensils where it is necessary to confine the steam in the vessel and cook under more or less pressure, and where the top or sections, or both, have a ready removability in relation to the vessel. As a mechanical fact, it is obvious that two concentrical rings made upon the same mold or by the same dies must produce a perfect union. It is also obvious that two parts of a metal vessel made by lapping the metal of each part separately will not, when brought together, form a perfect joint. Again, if either part is lapped or folded, the same principle makes a perfect jointure impossible. With my invention, whenever and wherever the rings come together the jointure is complete.

My device is intended to overcome the great difficulty of providing a close or tight joint in the several sections of steam-cookers now in general use—such, for instance, as the cooker described in the patent of S. W. Chamberlin, dated February 29, 1876. The ordinary union between the sections, also between the cover and top of cooker, do not retain the steam and odors within the kettle. The constructions as heretofore made usually depend upon the flat surface of the cover-top resting upon the top edge of the vessel. Rubber packing has also been employed; but none of the existing devices have proved satisfactory. My device to overcome this consists in forming two metal continuous rings about three-fourths to one inch in width, slightly tapering, each exactly concentric with the other in all its parts. I form these rings in dies and find that thus formed the two may be used with perfect success, the elasticity of the metal aiding the union. I unite one of these concentric rings to each of the adjacent sections or compartments to be brought together, and when placed in position the jointure is perfect the whole width of the rings and around the entire periphery. Should the rings not be pressed together, so that the whole width of the rings are in contact, yet depending upon the inner and outer surfaces of the rings to form the joint, instead of the top of the vessel or its top inner corners, the joint is always tight. With the joint now used the instant the joint is opened, however slightly, the steam escapes, and when started upward in the least the retaining qualities as well as the frictional contact of the joint are gone.

With my device the joint is strong and perfect so long as the edges of the concentric rings are in contact to any extent.

If desired, the ring may be placed above the top of a compartment, as shown in section E, Fig. 3, the ring being held in position by rivets y y or any similar manner. It will be seen from the foregoing that I rely upon a different principle of contacting surfaces for the tightness and strength of my joint—to wit, the perfect jointure of the interior surface of one with the exterior surface of a second continuous concentric beveled ring adapted to operate in connection with the removable parts of a steam-cooker, as described.

Having now described my invention and its mode of operation, what I claim as new, and desire to secure by Letters Patent of the United States, is—

In a steam-cooker or similar vessel, the device herein described for forming a tight joint consisting of two continuous concentrical rings adapted to be united, in combination with the several removable compartments or sections of said cooker or vessel, substantially as and for the purposes set forth.

THOS. F. DEAN.

Witnesses:
S. M. CHAMBERLIN,
BOWDOIN S. PARKER.